No. 720,814. PATENTED FEB. 17, 1903.
P. L. JONES.
WAGON BRAKE BLOCK.
APPLICATION FILED NOV. 13, 1902.
NO MODEL.
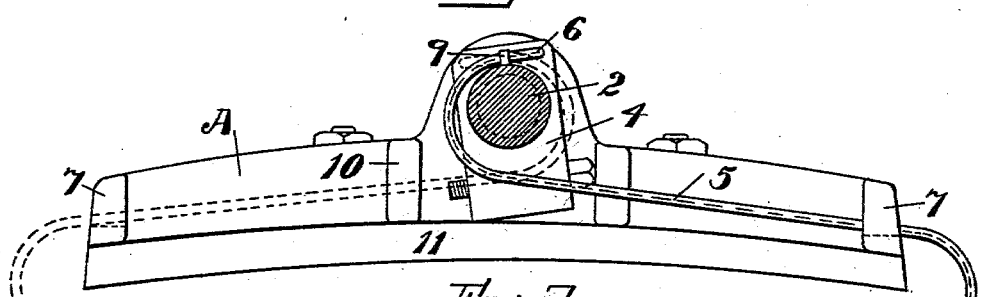
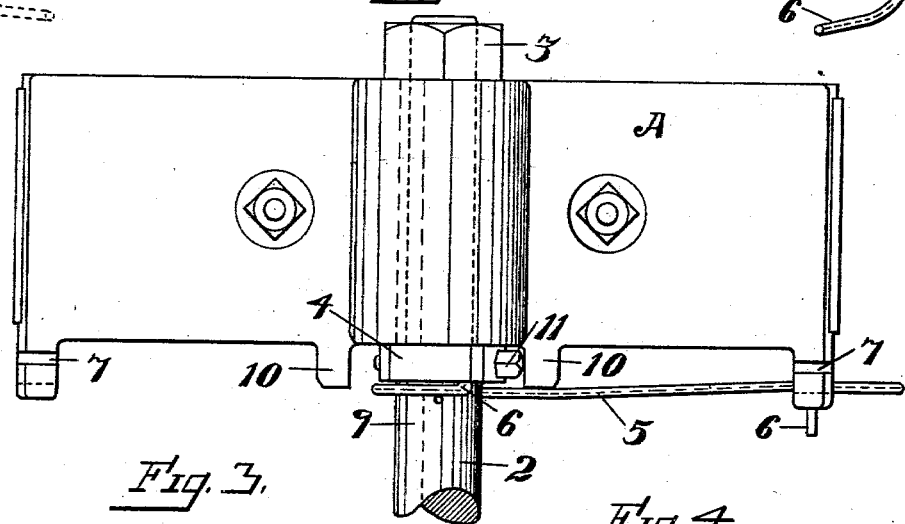
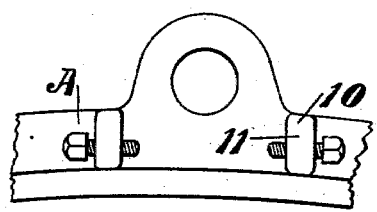
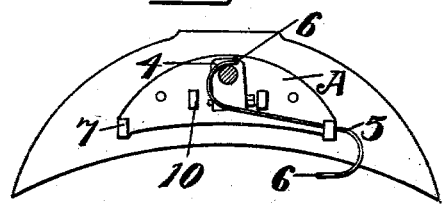
Witnesses
Inventor,
Peter L. Jones
By Dewey Strong & Co.
Atty

UNITED STATES PATENT OFFICE.

PETER L. JONES, OF SAN FRANCISCO, CALIFORNIA.

WAGON BRAKE-BLOCK.

SPECIFICATION forming part of Letters Patent No. 720,814, dated February 17, 1903.

Application filed November 13, 1902. Serial No. 131,154. (No model.)

*To all whom it may concern:*

Be it known that I, PETER L. JONES, a citizen of the United States, residing in the city and county of San Francisco, State of California, have invented an Improvement in Wagon Brake-Blocks; and I hereby declare the following to be a full, clear, and exact description of the same.

My invention relates to improvements in wagon brake-blocks; and it consists in a means for mounting the block upon the supporting and actuating shank, with a spring-adjusting attachment therefor, and means for regulating and limiting the movement of the block upon the shank.

It also comprises details of construction which will be more fully explained by reference to the accompanying drawings, in which—

Figure 1 is a side elevation of my invention, spring reversed in dotted lines. Fig. 2 is a front view of same. Fig. 3 is a modification of same with screws in lugs. Fig. 4 shows attachment to wooden brake-block.

It is customary to support brake-blocks upon a shank, through which motion is transmitted to move the brake block and shoe to or from the wheel periphery, said brakes being in the form of a hollow shell, within which a contained spring is made to so act as to tilt the brake-block upon its shank.

In my invention, A is a solid block or plate through which the shank 2 passes, this shank being turnable in a sleeve or journal which extends entirely through the brake-block and furnishes a continuous bearing for the shank, so that the block is always steady upon the shank and has but little wear of the bearing. The outer end of the shank is screw-threaded and has a nut, as at 3, which holds it in place. Just inside of the brake-block is a collar 4, which abuts against the inner edge of the brake-block, so that the latter is turnable between the collar and the exterior nut.

5 is a spring which is partially coiled about the shank and has the end bent at right angles, so as to enter a hole in the collar, as shown at 6, on the outside. The other end of the spring extends to the end of the brake block or plate A and is there interlocked with a groove or notch, as at 7, which retains a certain amount of tension upon the block, turning it so that when the shank has been moved by its actuating lever or mechanism, so as to withdraw the brake-block from contact with the wheel, this spring acts to hold the block so as to prevent it from turning and allowing the upper end to contact with the wheel. The position of the block is thus held so that when the brake is to be applied the lower end of the shoe will first contact with the wheel, and the continued pressure brings the whole face or length of the brake-shoe against the wheel, the object being to prevent the brake from tilting so as to bring the upper end into contact with the wheel when it is not in use.

The spring 5 is here shown in the form of an elongated letter S having each end bent, so that either end may be applied to engage with the collar 4, as shown at 6. An interlocking notch or slot is formed in a lug at each end of the shoe, as at 7, and when the brake is to be applied upon the right side of the vehicle the spring will pass around the shaft and connect with the notch at one end of the brake-shoe, so as to hold the brake properly out of contact with the wheel. If it is to be applied to the left side of the vehicle, it is only necessary to disengage the spring and reverse its position, so as to allow it to connect with the notched lug at the other end of the shoe, when it will be in readiness for use upon the opposite side. I am thus enabled to make these devices in quantity without reference as to whether they are to be used upon right or left side, and there will be no need for carrying a separate stock of rights and lefts.

The notches in the lugs at 7 are so formed that the outward pressure of the spring and its coiling tension together maintain the spring in place without other fastening; but it can be easily disengaged by pressing against the tension and allowing it to uncoil where it passes around the shank. The inner end is held in engagement with the hole in the collar by means of a pin 9, fixed in the shank just outside the position of this portion of the spring.

In order to adjust and limit the distance to which the brake-block can turn upon its shank, I have shown lugs 10 projecting from the side of the block or plate and a screw or screws 11 so fixed with relation to the lugs that the head or point of the screw may contact with the contiguous lug as the block turns in one direction or the other. If desired, two screws may be employed, passing through the lugs with their points upon each side of the lower part of the collar 4; but a preferable method is to form a screw-threaded hole through the lower extension of the collar and to fit the screw-threaded pin into this hole, so that it lies between the lugs, which in this case need not be perforated. Then by turning the screw out or in the head or point may be so moved as to form a stop against which the contiguous lug will contact as the brake-block is turned in that direction. Thus when the spring has sufficient tension the lug at one side will be constantly in contact with the adjacent end of the screw while the brake-block is off the wheel; but as soon as it makes contact with the wheel the block will turn upon the shaft, and the opposite lug will approach the opposite end of the screw and will limit its motion in that direction, so that if the spring at any time has not sufficient stiffness to properly hold the block the screw will prevent its turning too far in the other direction. In this construction I have shown the collar 4 as being of considerable width and extended a sufficient distance beyond the shaft to one side of the shank 2 to allow the screw 11 to pass through it, and it is preferable to so place the screw that the constant contact will be between the head and the adjacent lug.

It will be seen that this device may be equally well attached to iron or wooden brake-blocks and be fitted to blocks of any size, the spring being, as before stated, reversible, so that one pattern serves for both right and left sides, and the movement of the brake-block is limited in both directions by the lugs and adjusting set-screw. The wide lower end of the collar forms a sufficiently long bearing for the screw to prevent its becoming loosened in its threads by its use, and this portion also serves to steady the brake block or plate and prevent its tilting or wabbling upon the shank. The lugs at opposite ends of the screw prevent its working out and being lost.

Having thus described my invention, what I claim, and desire to secure by Letters Patent, is—

1. The combination in a brake of a solid block having a sleeve or journal extending transversely across it said block having, also, a slotted lug at each end, a shank fitting said journal; a retaining-nut on the outer end of the shank; a collar on the shank and fitting flatwise against the inner end of the sleeve said collar having a hole in its inner face; and a readily removable and reversible spring lying substantially parallel with and at one side of the inner side edge of the block, having one end curved to embrace the shank and provided with a bent portion to fit the hole in the collar, said spring having its outer end sprung into engagement with one of the slots in the end of the block.

2. The brake-block having a centrally-located sleeve and having lugs projecting laterally from the inner side edge said lugs provided with slots, in combination with a shank fitting said sleeve and provided with a collar to abut against the inner end of the sleeve; and a spring lying outside of and substantially parallel with the inner side edge of the block, having one end detachably secured to the collar and the opposite end sprung into engagement with the slot in one of the lugs of the block.

3. The brake-block having a central sleeve and a shank fitting the sleeve and provided with a collar, said block having laterally-extending slotted lugs at the ends and said collar having a hole in combination with a reversible, substantially S-shaped spring lying outside of substantially parallel with the inner side edge of the block and having its curved terminals bent at about right angles to the length of the spring, whereby either end of the spring may engage the hole in the collar, and an intermediate portion may be sprung into engagement with one of said slotted lugs.

In witness whereof I have hereunto set my hand.

PETER L. JONES.

Witnesses:
S. H. NOURSE,
JESSIE C. BRODIE.